United States Patent
Kappler et al.

(10) Patent No.: US 7,805,657 B2
(45) Date of Patent: Sep. 28, 2010

(54) TECHNIQUES TO DETERMINE TRANSMISSION QUALITY OF A SIGNAL PROPAGATION MEDIUM

(75) Inventors: Elizabeth Kappler, Hillsboro, OR (US); Patrick Connor, Beaverton, OR (US); Matthew Jared, Hillsboro, OR (US); Scott Dubal, Hillsboro, OR (US); Duke Hong, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1099 days.

(21) Appl. No.: 11/456,405

(22) Filed: Jul. 10, 2006

(65) Prior Publication Data

US 2008/0010661 A1 Jan. 10, 2008

(51) Int. Cl.
*H03M 13/00* (2006.01)
*G06F 11/00* (2006.01)
(52) U.S. Cl. .................. 714/758; 714/704; 714/752
(58) Field of Classification Search ............ 714/746, 714/758, 751, 752, 704, 819, 735, 736, 712, 714/748
See application file for complete search history.

(56) References Cited

U.S. PATENT DOCUMENTS

| | | | | |
|---|---|---|---|---|
| 5,581,577 A | * | 12/1996 | Abe | 375/225 |
| 5,917,838 A | * | 6/1999 | Wardrop | 714/767 |
| 6,199,191 B1 | * | 3/2001 | Iwata | 714/795 |
| 7,171,594 B2 | * | 1/2007 | Wyatt et al. | 714/704 |
| 2003/0081696 A1 | * | 5/2003 | Kim et al. | 375/316 |
| 2006/0045213 A1 | * | 3/2006 | Shen et al. | 375/340 |
| 2007/0033484 A1 | * | 2/2007 | Kim et al. | 714/758 |
| 2007/0162814 A1 | * | 7/2007 | Shen et al. | 714/752 |

OTHER PUBLICATIONS

"PCI/PCI-X Family of Gigabit Ethernet Controllers Software Developer's Manual", 82540EP/EM, 82541xx, 82544GC/EI, 82545GM/EM, 82546GB/EB, and 82547xx, Software Developer's Manual, Revision 2.5, Jul. 2005, Section 13.7 Statistics Registers, pp. 339-366.

* cited by examiner

*Primary Examiner*—Phung M Chung
(74) *Attorney, Agent, or Firm*—Glen B Choi

(57) ABSTRACT

Techniques are described that can be used to identify a defective communication channel in a communications network. A decoder in a receiver may decode a signal received from a network. The decoded signal may be re-encoded and compared with the signal received from the network. A count of differences between the re-encoded signal and the signal received from a network may be provided. An indication of errors remaining after the decoding may also be provided. Based on the count and the indication, a defect in the communication channel may be identified. A user may be notified and/or actions may take place.

22 Claims, 3 Drawing Sheets

TECHNIQUES TO DETERMINE TRANSMISSION QUALITY OF A SIGNAL PROPAGATION MEDIUM

FIELD

The subject matter disclosed herein relates to techniques to measure transmission quality of a signal propagation medium.

RELATED ART

Ethernet networks may communicate information at one gigabits-per-second (Gbps) or higher over high speed channels. These high speed channels, however, typically realize a corresponding increase in error rates. Techniques such as forward error correction may be used to decrease the error rates. Such techniques, however, may require a communication system to communicate additional overhead in the form of error correcting information. The additional overhead may decrease the effective throughput for a communication system.

Cable diagnostics use tests such as time-domain reflectometry (TDR) and insertion loss to analyze cable quality. These tests can report impedance mismatches, shorts, or opens in the cable and the distance to a problem area in a cable. For example, a cable diagnostic result could be given as an open at 25 meters out, which could mean the cable was broken at approximately 25 meters. Impedance mismatches and insertion loss data can be beneficial in detecting degraded quality cable.

Some cable diagnostic tests are offline tests and require the user to initiate the test. Users may not even utilize current cable diagnostic tests due to the fact that a separate test needs to be manually run. Even if cable diagnostic tests are used, they may not be used consistently enough to detect changes in configurations and signal propagation quality of a channel.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Some embodiments provide a real-time cable diagnostic test to proactively provide information concerning cable performance during normal online operation (i.e., the network component is able to receive signals from a network). Real-time cable diagnostics are important because a cable can be damaged during normal use in such a way that it does not bring the link down but does degrade quality of signals transmitted over the link. Signal quality transmission degradation can be caused by a severe bend in the cable or a heavy object placed on the cable which damages the structure of the cable. Also, a source of signal degradation could be put near to the cable to cause crosstalk.

Figure 1:
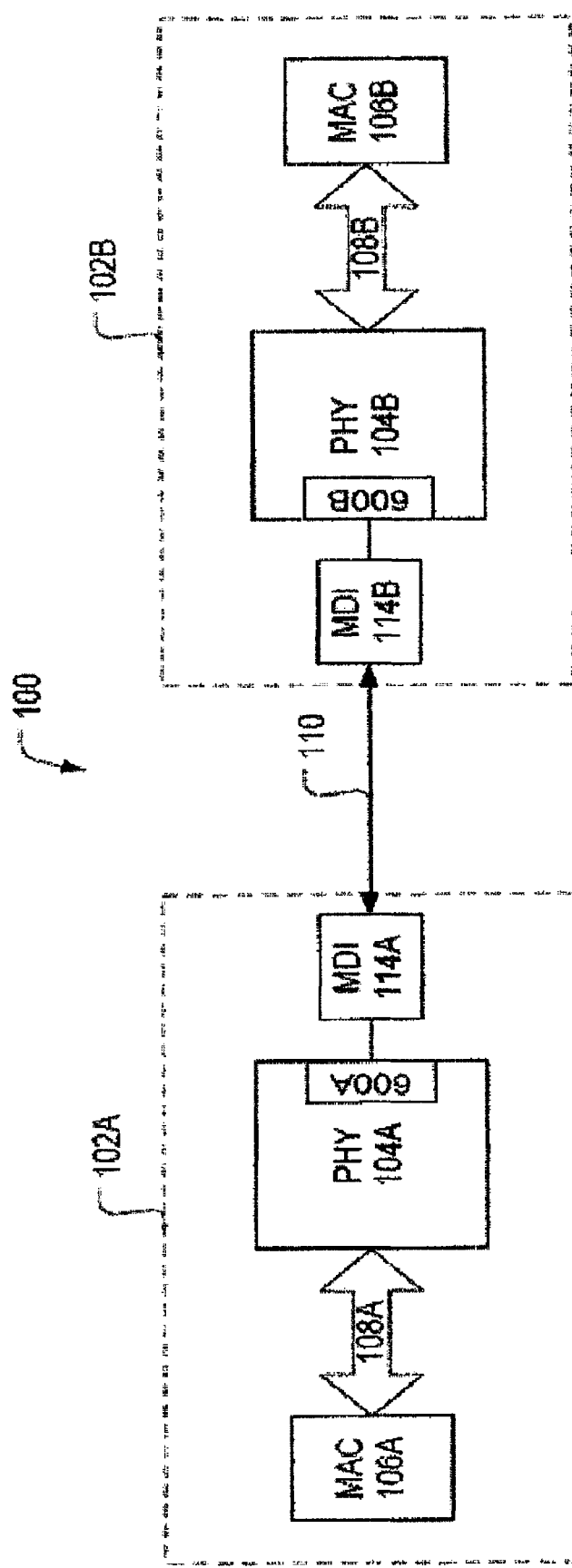
FIG. 1 depicts an example system embodiment in accordance with some embodiments of the present invention.

FIG. 1 is a block diagram of a system 100 provided in accordance with some embodiments of the present invention. System 100 may include a first network interface 102A and a second network interface 102B communicatively coupled over communication channel 110. Communication channel 110 may be implemented as a standard cable (not separately shown) such as, but not limited to, a Gigabit Ethernet cable, twisted pairs of copper wire, optic channels, wireless channels, power-line channels, acoustic/sonar channels, printed circuit board (PCB), backplanes, coaxial cable, or any other medium. For example, communication channel 110 may be Category 5, 6, 6a, or 7 network cabling and/or any other shielded or unshielded cabling. Communication channel 110 may operate at any number of bandwidths, including but not limited to 100 Mbps, 1 Gbps, 10 Gbps, and so forth. In one embodiment, for example, PHY units 104A and 104B may be communicatively coupled to communication channel 110 to support operation over differential, controlled impedance traces on a printed circuit board with two or more connectors and total length up to at least 1 meter in accordance with the Backplane Ethernet Specification. The embodiments are not limited in this context.

Network interfaces 102A and 102B may each include respective physical (PHY) units 104A and 104B and respective media access control (MAC) units 106A and 106B. PHY units 104A and 104B are coupled to MAC units 106A and 106B via respective bidirectional links 108A and 108B. Although not separately indicated in the drawing, network interfaces 102A and 102B may include transceivers, hybrids, digital signal processors, and other components. In one embodiment, PHY units 104A and 104B may include transceivers and hybrids, for example, and MAC units 106A and 106B may be implemented with a digital signal processor or other logic.

In one embodiment, PHY units 104A and 104B may include respective receivers 600A and 600B. Each receiver 600A and 600B may include an adaptive digital interference canceller and an equalizer module, for example. Receivers 600A and 600B may be configured such that the adaptive interference cancellers may be adapted in accordance with the various embodiments of adaptation techniques or processes described herein. For, example in one embodiment, adaptive interference canceller adaptively filters a noise reference input to maximally match and subtract out noise or interference from a primary input signal. In various embodiments, network interfaces 102A and 102B may be part of a computer system and may be coupled to a general purpose processor to which other components such as volatile and non-volatile memory devices, mass storage, and input/output devices may be coupled or may be implemented using other logic.

Network interfaces may allow devices coupled thereto to communicate information over a network. In various embodiments, network interfaces 102A and 102B may represent any network interface suitable for use with a number of different Ethernet techniques as defined by the Institute of Electrical and Electronics Engineers (IEEE) 802.3 series of standards. For example, network interfaces 102A and 102B may include logic capable to operate in accordance with the IEEE 802.3-

2005 standard. The IEEE 802.3-2005 standard defines 1000 megabits per second (Mbps) operations (1000BASE-T) using four pair twisted copper Category 5 wire, 10 Gbps operations using fiber cable, and 10 Gbps operations (10GBASE-CX4) using copper twinaxial cable (collectively referred to herein as "Gigabit Ethernet"). More particularly, network interfaces 102A and 102B may include logic capable to operate in accordance with the IEEE Standard 802.3-2005 titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications, Amendment: Ethernet Operation over Electrical Backplanes," Draft Amendment P802.3ap/Draft 2.1, 2005 ("Backplane Ethernet Specification"). Network interfaces 102A and 102B, however, are not necessarily limited to the techniques defined by these standards, and network interfaces 102A and 102B may use other techniques and standards as desired for a given implementation. The embodiments are not limited in this context.

Network interfaces 102A and 102B may include logic capable to operate in accordance with the IEEE Proposed Standard 802.3an titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications: Amendment: Physical Layer and Management Parameters for 10 Gb/s Type 10GBASE-T," Draft Amendment P802.3an/Draft 3.1, 2005 ("10GBASE-T Specification"). Embodiments of network interface 102A and 102B, however, are not necessarily limited to the techniques defined by these standards, and network interfaces 102A and 102B may use other techniques and standards as desired for a given implementation. The embodiments are not limited in this context.

As shown in FIG. 1, network interfaces 102A and 102B may include respective MAC units 106A and 106B and PHY units 104A and 104B. In various embodiments, MAC units 106A and 106B and/or PHY units 104A and 104B may be capable to operate in accordance with one of the Ethernet architectures as previously described, such as the IEEE 802.3-2005 series of standards including the 10GBASE-T and/or Backplane Ethernet Specification. Although FIG. 1 illustrates system 100 with a limited number of elements, it may be appreciated that system 100 may include more or less elements in different topologies and still fall within the scope of the embodiments. The embodiments are not limited in this context.

In one embodiment, for example, MAC units 106A and 106B and/or PHY units 104A and 104B may be capable to operate in accordance with the 10GBASE-T and/or the Backplane Ethernet Specification, for example. Backplane Ethernet combines the IEEE 802.3 MAC and MAC Control sublayers with a family of Physical Layers defined to support operation over a modular chassis backplane. Backplane Ethernet supports the IEEE 802.3 MAC operating at 1000 Mbps and/or 10 Gbps. For 1000 Mbps operation, the family of 1000BASE-X PHY signaling systems is extended to include 1000BASE-KX. For 10 Gbps operation, two PHY signaling systems are defined. For operation over four logical lanes, the 10GBASE-X family is extended to include 10GBASE-KX4. For serial operation, the 10GBASE-R family is extended to include 10GBASE-KR (e.g., using various serializer/deserializer or "SERDES" techniques). Backplane Ethernet also specifies an Auto-Negotiation function to enable two devices that share a backplane link segment to automatically select the best mode of operation common to both devices.

It will be appreciated by those skilled in the art that 10GBASE-T is a standard proposed by the IEEE 802 committee to provide 10 Gigabit/second connections over conventional unshielded twisted pair cables. The committee currently working on the standard is IEEE 802.3an, a subgroup of IEEE 802.3. To run multi-gigabit data rates on four-pair copper cabling, however, it may be necessary to employ sophisticated digital signal processing techniques to eliminate the effects of near-end and far-end cross-talk between pairs of cable and to remove the effects of near-end and far-end signal reflections, otherwise known as echoes. Elimination of noise that is external to the cable, such as electromagnetic interference from outside sources or adjacent cables, is difficult. Cable-to-cable noise, or alien cross-talk, for example, prevents wiring from reliably operating under worst-case 330-foot conditions. Accordingly, to support a suitable cabling system for 10GBASE-T, a new PHY, which interfaces with existing 10 G MAC and Gigabit Media Independent Interface (GMII) in the IEEE model, is proposed. The PHY includes capability to transmit, receive, and manage encoded signals that are recovered from cabling systems. The PHY may be based, for example, on pulse amplitude modulation (PAM) encoding to encode information as a stream of pulses with discrete amplitudes. This is the same modulation technique currently used in 100Base-T and 1000Base-T, but the symbol rates and digital signal processing techniques are enhanced.

With reference to the seven-layer Open System Interconnect ("OSI") Reference Model developed by the International Standards Organization ("ISO"), MAC units 106A, B implement MAC layer operations. The MAC layer is a sublayer of the data link layer. The data link layer is primarily concerned with transforming a raw transmission facility into a communication line free of undetected transmission errors for use by the network layer. The data link layer may accomplish this task by breaking input data into data frames, transmitting the data frames sequentially, and processing acknowledgement frames. The MAC sublayer may provide additional functionality concerned with controlling access to broadcast networks (e.g., Ethernet). In the case of Ethernet architecture, for example, the MAC sublayer may implement a CSMA/CD protocol.

In various embodiments, MAC units 106A and 106B are coupled to respective PHY units 104A and 104B via respective bi-directional links 108A and 108B to provide data paths between MAC units 106A and 106B and respective PHY units 104A and 104B. Bi-directional links 108A and 108B are often referred to as a Media Independent Interface ("MII"), an xMII in the case of implementations of 100 Mbps or higher, X attachment unit interface ("XAUI") in the case of 10 Gbps implementations, or X fiber interface ("XFI") in the case of dual path 10 Gbps implementations. In one embodiment, for example, bi-directional links 108A and 108B may be implemented as a 10 Gbps MII (XGMII) when MAC units 106A and 106B and/or PHY units 104A and 104B are implemented for serial operations in accordance with 10GBASE-KR as defined by the Backplane Ethernet Specification. Bi-directional links 108A, B may use a 4-octet wide data path, for example, when implemented as an XGMII bi-directional link. In one embodiment, for example, bi-directional links 108A and 108B may comprise a XAUI link where the XGMII from MAC units 106A, B is extended through a XGXS sublayer (e.g., XGMII extender sublayer) which provides XGMII on both sides with XAUI used therebetween to extend it. The embodiments are not limited in this context.

In various embodiments, PHY units 104A and 104B are capable to perform physical layer operations. The physical layer is primarily concerned with transmitting raw bits over physical medium, e.g., communication channel 110 physical medium, which may be some form of network. PHY units 104A and 104B are coupled to communication channel 110 via respective media dependent interfaces (MDI) units 114A and 114B, for example. In the four pair twisted conductor embodiment, PHY units 104A and 104B converts digital data received from respective MAC units 106A and 106B (e.g., 1000BASE-X or 10GBASE-X) into analog symbols (e.g., 1000BASE-T or 10GBASE-T) for transmission over communication channel 110. For example, PHY units 104A and 104B may encode the digital data using Manchester encoding or the like.

For 10GBASE-T compliant systems, the received signal may include payload bits encoded in accordance with 128 double square (DSQ) symbols modulation, low density parity check (LDPC) and mapped using pulse amplitude modulation (PAM) symbols (e.g., 16 levels), and/or have Tomlinson-Harashima precoding applied, although other encoding schemes may be used. For example, for a 1000BASE-T compliant receiver, the received signal may be encoded using pulse amplitude modulation (PAM) 5 encoding for modulation and an FEC code of the Trellis Coding Modulation (TCM). Logic may decode such signals according to the appropriate decoding schemes.

In various embodiments, PHY units 104A and 104B may further include logic capable to perform operations for various sublayers of the physical layer, including a physical coding sublayer ("PCS"), a physical medium attachment ("PMA") sublayer, and a physical medium dependent ("PMD") sublayer. In one embodiment, for example, PHY units 104A and 104B may perform FEC operations for the various sublayers, such as used between the PMA sublayer and PCS sublayer, for example.

In some embodiments, although not depicted, either or both of PHY units 104A and 104B may be communicatively coupled to another device using a medium similar to that of channel 100.

In some embodiments, either or both of PHY units 104A and 104B include the capability to determine a number of errors in a received signal. In some embodiments, the quality of channel 100 is determined based on a number of errors in the signal. In some embodiments, the quality of channel 100 is reported to the user. For example, the number of errors detected per unit time may increase as the cable quality decreases. In some embodiments, the number of errors caused by the channel may be determined by comparing the data actually received to encoded corrected data. The encoded corrected data may be determined by taking the results of the error correction decoder and re-encoding it to take the same form as the original received data. The original received data and the re-encoded corrected data may be compared to determine the number of errors which were corrected as part of the error correction process. This data can be used by cable diagnostic logic to help indicate quality of cable signal transmission to a user.

Figure 2:
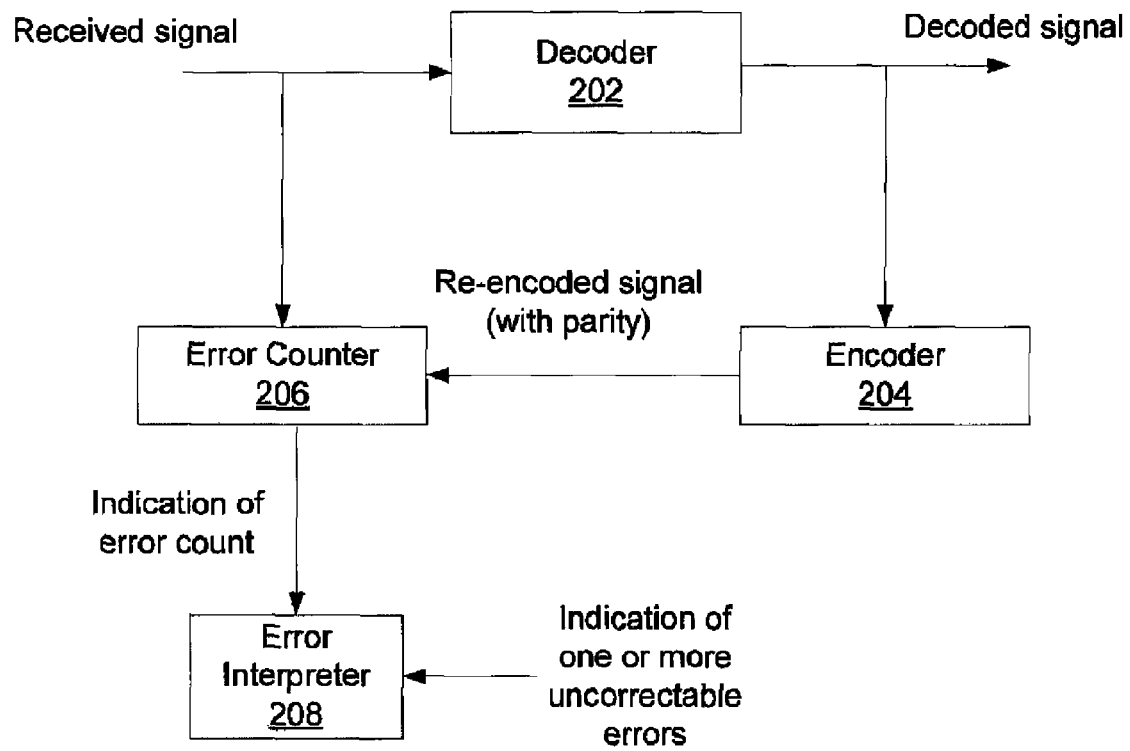
FIG. 2 depicts an example of interactive elements in accordance with some embodiments of the present invention.

FIG. 2 depicts an example of interactive elements in accordance with some embodiments of the present invention. Some embodiments detect degradation in received signal quality potentially caused by issues in a communication channel used to transmit the received signal. Some embodiments attempt to avoid the receiver going offline for a technician or other source to run a cable diagnostic test. For example, as a rate of errors that remain uncorrected in a signal after decoding and error correction by decoder 202 rises, a determination of the presence of issues in the communication channel may be made. Some embodiments attempt to determine a communication channel quality level, generate communication channel quality alarms to the user, and potentially perform corrective measures.

Decoder block 202 may receive a signal from a network transmitted according to at least one protocol. For example, the signal may be received by a network interface such as but not limited to network interface 102A or 102B. For example, de-modulation, parity checking, and decoding may have been applied to the signal based on the relevant transmission protocol. Decoder block 202 may decode and correct errors in the signal by applying relevant decoding schemes. In some embodiments, decoder block 202 may decode and error correct the received signal in part using a Forward Error Correction (FEC) code included with the received signal. For example, for 10GBASE-T, the FEC code may be a Low Density Parity Check (LDPC). As another example, for 1000BASE-T, an FEC code of TCM may be used. Other decoding and error correction schemes may be used. Parity indication may or may not be provided. Parity may indicate a number of 0s and 1s in a signal. Decoder block 202 may provide a decoded signal to a media access controller (MAC) (not depicted) and encoder 204. For example, the MAC may be any of MAC units 106A or 106B.

Encoder 204 may receive the decoded signal from decoder block 202. In some embodiments, encoder 204 may encode the decoded signal from decoder 202. For example, encoder 204 may apply Forward Error Correction (FEC) encoding in accordance with relevant standards. Encoder 204 may apply a similar encoding as that applied to the received signal. For example, for 10GBASE-T, the FEC code may be a Low Density Parity Check (LDPC). As another example, for 1000BASE-T, an FEC code of Trellis Coding Modulation (TCM) may be used. For example, encoder 204 may provide a parity indication with the encoded signal. Other encoding schemes may be used.

Error counter 206 may receive the received signal provided to decoder 202 and the re-encoded signal from encoder 204. Error counter 206 may compare each bit from the received signal and the re-encoded signal. Error counter 206 may count a number of differences between bits of received signal and the re-encoded signal. The received signal and re-encoded signals may be the same format. For example, the compared bits may be of similar bit positions in a packet or frame. The count of number of differences may be indicated through a register (not depicted), although other techniques may be used.

Error interpreter 208 may determine a source of errors based at least on error indications from error counter 206 as well as uncorrectable errors. Error indications from error counter 206 herein are referred-to as correctable errors. Errors that are not corrected by decoder 202 may exhibit as errors in the data identified at the MAC or other logic and may be represented by MAC statistics counters as "uncorrectable errors". "Uncorrectable errors" may be errors identified in the decoded signal by logic such as but not limited to MAC or other logic and may be independent of error inducing issues potentially caused by the communication channel. Examples of "uncorrectable errors" are described in Section 13.7 of "PCI/PCI-X Family of Gigabit Ethernet Controllers Software Developer's Manual" from Intel Corporation, revision 2.5 (July 2005), although other uncorrectable errors may be included. Instances of uncorrectable errors may include but are not limited to a determined Cyclical Redundancy Coding (CRC) error, packet not being an integer number of bytes in length, packet symbol error, occurrence of a missed packet, successfully transmitted packet encountering one or more collision, sequence error, and/or packet receive length errors.

A suitable test to determine a bit error rate of the decoded signal is described in IEEE 802.3 (2000), section 40.6.1.3.1, "Receiver Differential Input Signals". A suitable test prescribes that the receiver shall have a frame error rate of less than $10^{-7}$ for 125 octet frames. A frame error rate of $10^{-7}$ for 125 octet frames is equivalent to a bit error rate (BER) of $10^{-10}$ for any size of frame. The rate of uncorrectable errors can be determined by the following relationship, although other relationships may be used:

$$BER=(TGP-MP-RGP)/(TGP \times BF \times BB)$$

where:
- TGP=number of good frames transmitted
- MP=number of missed packets
- RGP=number of good frames received
- BF=number of bytes per frame
- BB=number of bits per byte Numerous actions may take place provided the bit error rate of the decoded signal is at or below a user-defined bit error rate and a correctable error rate is at or above a user-defined rate. A determination of correctable error bit rate can be made on a continual basis. For example, a service person may be notified to check the communication channel (e.g., perform a time domain reflectometry (TDR) test). For example, the network component may reset its connection with a connection partner in accordance with relevant protocols such as but not limited to Ethernet. For example, the user could be warned of potential cable quality degradation. For example, an offline cable test could be requested to be performed to determine more detailed cable information. For example, a request may be made to a technician to replace the cable. For example, if implemented in a router could be to reroute the traffic to another non-faulty cable.

For example, provided the bit error rate of the decoded signal is at or below a user-defined bit error rate and a correctable error rate is at or above a user-defined rate, the network component may request that a transmitter change the transmission coding and/or requesting a lowering of signal transmission rate. For example, the network component may use auto-negotiation to communicate to a transmitter a request in change in coding and/or lowering the signaling rate. Through utilizing multiple buffers, queues and priority tagging, settings could be altered so that that a rate at which high priority traffic is available for use is less impacted by changes in signal transmission rate.

Figure 3:
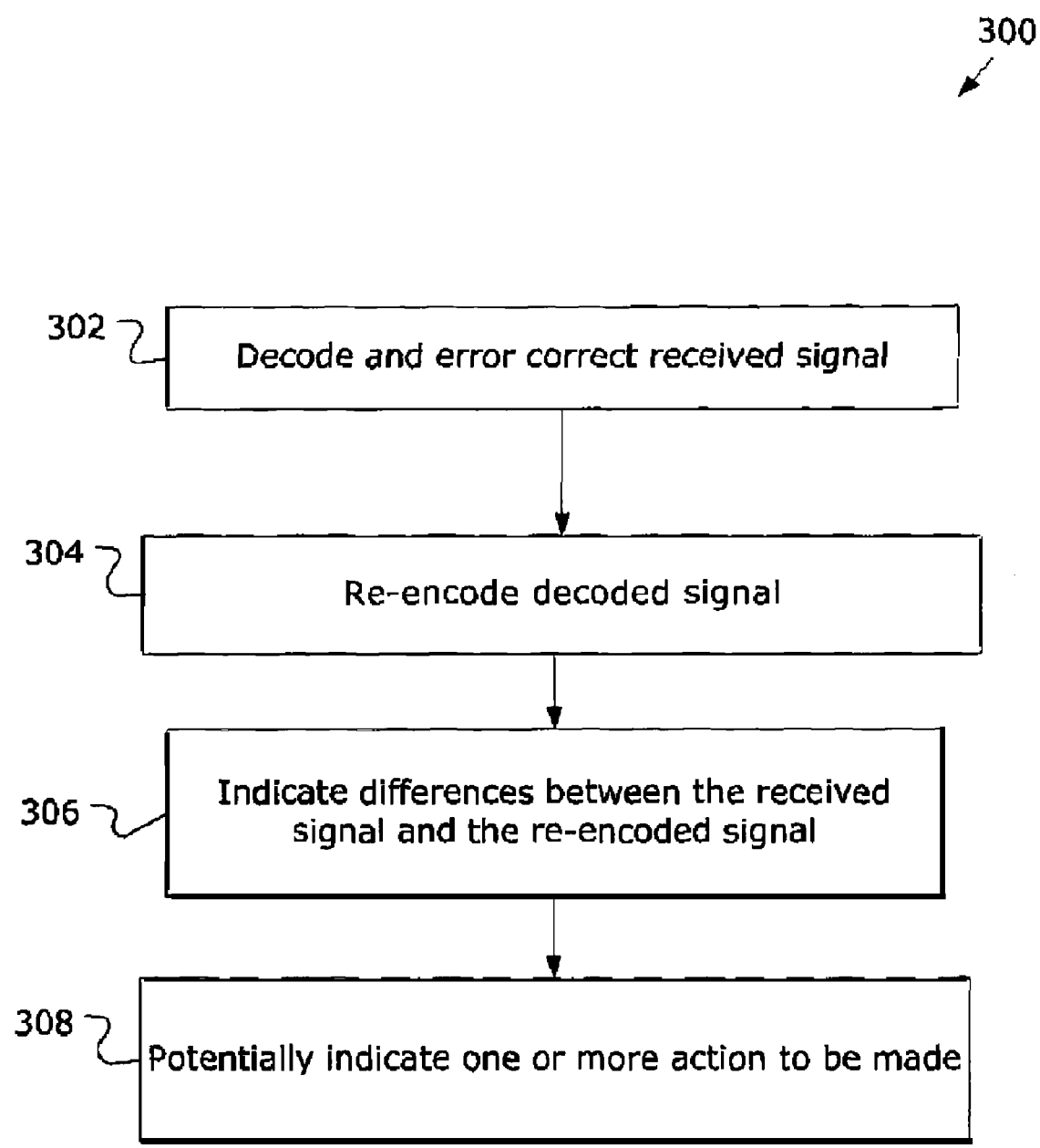
FIG. 3 depicts an example flow diagram in accordance with some embodiments of the present invention.

FIG. 3 depicts an example flow diagram in accordance with some embodiments of the present invention. In block 302, decoding and error correction may take place on a signal received from a network. De-modulation, parity checking, and decoding may have been applied to the signal based on the relevant transmission protocol. In some embodiments, decoding and error correction may include decoding and error correcting the received signal in part using a Forward Error Correction (FEC) code. For example, for 10GBASE-T, the FEC code may be a Low Density Parity Check (LDPC). As another example, for 1000BASE-T, an FEC code of TCM (Trellis Coding modulation) may be used. In some embodiments, decoding does not provide an indication of parity. A decoding scheme suitable to decode the received signal and based on the encoding format of the received signal may be used.

In block 304, the decoded signal may be re-encoded using the encoding format of the signal received from a network. In some embodiments, encoding may include providing an FEC code based on the decoded signal. In some embodiments, for 10GBASE-T, the FEC code may be a Low Density Parity Check (LDPC). As another example, for 1000BASE-T, an FEC code of TCM may be used. In some embodiments, block 304 may in addition provide parity indication with the re-encoded signal.

In block 306, an indication of differences between the received signal and the re-encoded signal provided from block 304 may be provided. A count of a number of differences between bits of the received signal and the re-encoded signal may be provided. The compared bits may be of similar bit positions in a packet or frame.

In block 308, to the extent errors are recognized as potentially caused by the communication channel, an indication of one or more action may be made. For example, consideration of correctable and uncorrectable errors may take place in block 308. "Correctable errors" may be errors present in a signal after decoding and error correction in block 302. Correctable errors may be determined by differences between the signal received in block 302 and the re-encoded signal from block 304. "Uncorrectable errors" may be errors in the decoded signal from block 302 and may be independent of error inducing issues potentially caused by the communication channel. For example, a bit error measuring technique described with respect to error interpreter 208 may be used to determine a rate of uncorrectable errors. In the event that the rate of correctable errors exceeds a user-defined level but the rate of uncorrectable errors is less than a threshold, errors may be identified as caused by the communication channel. Numerous actions may take place such as but not limited to those described earlier with regard to error interpreter 208. In some embodiments, actions may take place that avoid making the network component unavailable to receive traffic.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   receiving a signal encoded according to a first encoding scheme;
   decoding the signal;
   encoding the decoded signal in compliance with the first encoding scheme;
   indicating a number of correctable errors based on a comparison between the received signal and the encoded decoded signal;
   selectively indicating at least one action based in part on a rate of correctable errors and a rate of uncorrectable errors, wherein the at least one action comprises requesting lowering of a signal transmission rate and requesting a change in transmission coding scheme; and
   allocating at least one buffer for high priority traffic to reduce a reduction in received rate of the high priority traffic in response to the at least one action.

2. The method of claim 1, wherein the selectively indicating comprises selectively indicating in response to a bit error rate of the decoded signal being less than a maximum level and the rate of correctable errors being more than a threshold.

3. The method of claim 1, wherein the decoding comprises performing forward error correction.

4. The method of claim 1, wherein the encoding comprises performing forward error correction encoding.

5. The method of claim 4, wherein the encoding further comprises providing an indication of parity.

6. The method of claim 1, further comprising receiving the received signal over a communication channel in compliance with the IEEE 802.3an series of standards.

7. The method of claim 1, wherein at least one action is selected from a group consisting of: requesting performance of a time-domain reflectometry test, warning of potential cable transmission quality degradation, requesting an offline cable test to be performed to determine more detailed cable information, requesting a technician to replace the communication channel, and rerouting traffic through another communication channel.

8. An apparatus comprising:
   a decoder to receive a signal encoded according to a first encoding scheme and to decode and error correct the signal;
   an encoder to encode the decoded signal in compliance with the first encoding scheme;
   an error counter to indicate a number of correctable errors based on a comparison between the received signal and the encoded decoded signal;
   logic to selectively indicate at least one action based in part on a rate of correctable errors and a rate of uncorrectable errors, wherein the at least one action comprises requesting lowering of a signal transmission rate and requesting a change in transmission coding scheme; and
   logic to allocate at least one buffer for high priority traffic to reduce a change in received rate of the high priority traffic in response to the at least one action.

9. The apparatus of claim 8, wherein the logic to selectively indicate is to selectively indicate in response to a bit error rate of the decoded signal being less than a maximum level and the rate of correctable errors being more than a threshold.

10. The apparatus of claim 8, wherein the decoder is to perform forward error correction.

11. The apparatus of claim 8, wherein the encoder is to perform forward error correction encoding.

12. The apparatus of claim 8, wherein the encoder is to provide an indication of parity.

13. The apparatus of claim 8, further comprising a media access controller to provide the rate of uncorrectable errors in compliance with IEEE 802.3 (2000).

14. The apparatus of claim 8, wherein the received signal is compliant with the IEEE 802.3an series of standards.

15. The apparatus of claim 8, wherein at least one action is selected from a group consisting of: requesting performance of a time-domain reflectometry test, warning of potential cable transmission quality degradation, requesting an offline cable test to be performed to determine more detailed cable information, requesting a technician to replace the communication channel, and rerouting traffic through another communication channel.

16. A system comprising:
   a communication channel;
   an interface communicatively coupled to the communication channel; and
   a receiver communicatively coupled to the interface, the receiver comprising:
      a decoder to receive a signal encoded according to a first encoding scheme and to decode the signal,
      an encoder to encode the decoded signal in compliance with the first encoding scheme,
      an error counter to indicate a number of correctable errors based on a comparison between the received signal and the encoded decoded signal,
      logic to selectively indicate at least one action based in part on a rate of correctable errors and a rate of uncorrectable errors, wherein the at least one action comprises requesting lowering of a signal transmission rate and requesting a change in transmission coding scheme; and
      logic to allocate at least one buffer for high priority traffic to reduce a change in received rate of the high priority traffic in response to the at least one action.

17. The system of claim 16, wherein the communication channel comprises a coaxial cable.

18. The system of claim 16, wherein the logic to selectively indicate is to selectively indicate in response to a bit error rate of the decoded signal being less than a maximum level and the rate of correctable errors being more than a threshold.

19. The system of claim 16, wherein the decoder is to perform forward error correction.

20. The system of claim 16, wherein the encoder is to perform forward error correction encoding.

21. The system of claim 16, wherein the encoder is to provide an indication of parity.

22. The system of claim 16, wherein at least one action is selected from a group consisting of: requesting performance of a time-domain reflectometry test, warning of potential cable transmission quality degradation, requesting an offline cable test to be performed to determine more detailed cable information, requesting a technician to replace the communication channel, and rerouting traffic through another communication channel.

* * * * *